Patented Dec. 8, 1936

2,063,297

UNITED STATES PATENT OFFICE 2,063,297

ACID HARDENING FIXING COMPOSITION AND METHOD OF PREPARING THE SAME

John I. Crabtree and Harold D. Russell, Rochester, N. Y., assignors, by mesne assignments, to Eastman Kodak Company, Jersey City, N. J., a corporation of New Jersey No Drawing. Application October 25, 1934, Serial No. 749,924

12 Claims. (Cl. 95—88)

This invention relates to photographic fixing baths, and more particularly to a powdered composition adapted for the preparation of such baths.

Many attempts have been made to compound a solid preparation containing sodium thiosulfate and a solid acid hardener, such as citric acid, potassium alum, and sodium sulfite, in the form of a single powder for the preparation of an acid hardening fixing bath. It has been found, however, that on storage of such a composition at mildly elevated temperatures, especially storage under tropical conditions at temperatures up to 110° F., the acid materials react with the sodium thiosulfate liberating sulfur, so that on dissolving the powder in water the solution is milky, due to the presence of colloidal sulfur. This decomposition of the sodium thiosulfate is known as sulfurization and is one of the most serious defects of known solid compositions adapted for the preparation of acid fixing baths. Baths of this type generally contain both citric acid and potassium alum. The citric acid is itself sufficiently acid to react with the sodium thiosulfate, while, in addition, the potassium alum tends to decompose with the production of free sulfuric acid. It will thus be seen that the sodium thiosulfate in such a powdered composition is in constant danger of decomposition by the acid components normally present in the mixture.

It is accordingly the principal object of the present invention to obviate the above-mentioned defects of known solid compositions adapted for the preparation of acid fixing baths and to provide a method whereby sulfurization of the sodium thiosulfate contained in such compositions may be effectively prevented. A further object is to provide a powdered solid composition of matter adapted for the preparation of acid fixing baths which will not undergo sulfurization during storage at reasonably high temperatures, such as those encountered in storage under tropical conditions. A still further object is to provide a powdered solid composition adapted for the preparation of an acid hardening fixing bath in which the various acid ingredients or their decomposition products are effectively prevented from reacting with the sodium thiosulfate to produce colloidal sulfur when such compositions are dissolved in water. Other objects will appear hereinafter.

These objects are accomplished by the following invention which, in its broadest aspects, comprises the use of a sulfurization inhibitor in intimate contact with the sodium thiosulfate. We have discovered that the above-mentioned sulfurization of the thiosulfate by the various acid constitutents present in the composition, such as citric or boric acid and free sulfuric acid, (derived from the decomposition of potassium alum) may be effectively prevented by maintaining the surfaces of the sodium thiosulfate crystals in intimate contact with certain sulfite bodies, such as sodium sulfite, or with sulphur dioxide dissolved in triethanolamine.

In the following examples we have set forth several of the preferred embodiments of our invention, but it is to be understood that they are included merely for purposes of illustration and not as a limitation thereof.

We have found that the sodium thiosulfate crystals may be protected from the sulfurizing tendency of the acid constituents normally present in the solid fixing bath preparation if the crystallized sodium thiosulfate is heated, together with crystallized or anhydrous sodium sulfite in such proportions that the ingredients, after such treatment, will bear the proper relation one to another as regards the fixing bath preparation of which they are to become a part. The crystalline sodium thiosulfate melts in its water of crystallization and the sulfite dissolves in this solution. The heating is continued until the water is completely driven off. This leaves the dry sodium thiosulfate in intimate contact with sodium sulfite. The following example will illustrate a typical procedure for the preparation of an acid hardening fixing bath in which the sodium thiosulfate crystals are protected against sulfurization by the use of a sulfurization inhibitor in accordance with our invention.

Example I 100 grams of crystallized sodium thiosulfate ($Na_2S_2O_3.5H_2O$) are mixed with 2.0 grams of anhydrous sodium sulfite ($Na_2SO_3$). The mixture is subjected to gentle heating at a temperature of 65° to 75° C. for a period of 10 hours. As previously indicated, the crystals melt in their water of crystallization and, upon continued heating, the moisture is driven off and both the sodium thiosulfate and the sodium sulfite are left in an anhydrous condition, the sodium thiosulfate particles in the mixture being coated by or at least in intimate contact with the sodium sulfite. A powdered solid composition adapted, when dissolved, for the preparation of an acid hardening fixing bath, has the following composition:

| | Grams |
|---|---|
| Sodium thiosulfate | 160 |
| Anhydrous sodium sulfite | 5 |
| Sodium bisulfite | 5 |
| Boric acid | 5 |
| Potassium alum | 22.5 |
| Anhydrous sodium acetate | 22.5 |

In the above composition the first two ingredients are prepared as just described, that is, by being heated together in such manner that the sodium sulfite is in intimate contact with the sodium thiosulfate. It is found that such a composition will not sulfurize, even if kept for long periods under relatively elevated temperatures, such as temperatures of 110° F. and more, as is the case in storage under tropical conditions.

To prepare a fixing bath from such a composition, all that is necessary is to add to the above formula water sufficient to make one liter.

*Example II*

An alternative method of protecting the sodium thiosulfate crystals against sulfurization may be carried out as follows: A convenient weight of the sodium thiosulfate is simply moistened with a solution of sulphur dioxide dissolved in triethanolamine in alcohol, the solution drained from the crystals, and the crystals are then dried. Upon drying, it is found that the sodium thiosulfate crystals have become coated with a thin layer of triethanolamine containing sulphur dioxide. Sulfur dioxide is readily soluble in triethanolamine and a solution may be prepared by simply passing sulfur dioxide gas into triethanolamine. Triethanolamine produces an alkaline reaction when dissolved in water and sulfur dioxide produces an acid reaction. In order that the mixture will not precipitate alum, sufficient sulfur dioxide should be used to produce a neutral or acid reaction when added to water. Concentrations which are suitable may vary between 149 parts of triethanolamine to 32 parts of sulfur dioxide by weight, to equal parts of each.

A powdered solid composition adapted for the preparation of an acid fixing bath may be prepared as in Example I by compounding the protected sodium thiosulfate with appropriate amounts of other ingredients desired in the fixing bath. Such a preparation may have the following composition:

| | Grams |
|---|---|
| Anhydrous hypo | 160 |
| Triethanolamine | 1 |
| Sulfur dioxide | 1 |
| Sodium bisulfite | 7.5 |
| Alum | 22.5 |
| Sodium acetate (anhydrous) | 22.5 |
| Boric acid | 5.0 |

Although for convenience we have chosen to illustrate our invention by reference to certain specific sulfurization inhibitors and to certain specific fixing bath compositions, it is evdent that the broad scope of our invention includes any substances which will prevent the decomposition of sodium thiosulfate by the action of free acid in the composition. It is also evident that many changes may be made in the amounts and character of the ingredients and the procedures employed for compounding without departing from the spirit or scope of our invention.

By the term sulfurization inhibitor as used herein and in the claims we refer to any substance or chemical compound which has the ability to protect sodium and other thiosulfates against the action of free acid in the composition, is compatible with the other components of the composition, and at the same time does not interfere in any way with the proper functioning of the bath. The thiosulfates which can be protected in this manner are the alkali metal thiosulfates which includes ammonium and certain organic thiosulfates which includes the salts of the primary, secondary, and tertiary amines and the quarternary ammonium bases. The sulfurization inhibitors may include all of the above as sulfites and sulfur dioxide dissolved in suitable solvents or mixtures of these.

In the above examples and in the claims we have referred to the use of a sulfurization inhibitor comprising sulfur dioxide dissolved in triethanolamine. Under the normal conditions of use of this type of inhibitor, that is, by employing a solvent for the triethanolamine such as 95% alcohol, the sulfur dioxide reacts with the triethanolamine to produce a sulfite of the latter compound. By the term "sulfite" as used herein, we refer both to inorganic sulfites, such as those typified by sodium sulfite, and to organic sulfites, such as result from the interaction of sulfur dioxide and triethanolamine as described.

What we claim is:

1. The method of rendering immune to sulfurization the sodium thiosulfate crystals contained in a powdered composition adapted for making up a photographic fixing bath and comprising sodium thiosulfate, sodium sulfite, alum, and a solid organic acid, which comprises enclosing the surfaces of the crystals of thiosulfate in a sulfite selected from the group consisting of sodium sulfite, and triethanolamine sulfite, whereby access of acid in the composition to the crystals is prevented and employing the coated crystals as an ingredient of said composition.

2. The method of rendering immune to sulfurization the sodium thiosulfate crystals contained in a powdered composition adapted for making up a photographic fixing bath and comprising sodium thiosulfate, sodium sulfite, alum, and a solid organic acid, which comprises enclosing the surfaces of the crystals of the thiosulfate in sodium sulfite, whereby access of acid in the composition to the crystals is prevented and employing the coated crystals as an ingredient of said composition.

3. The method of rendering immune to sulfurization the sodium thiosulfate crystals contained in a powdered composition adapted for making up a photographic fixing bath and comprising sodium thiosulfate, sodium sulfite, alum, and a solid organic acid, which comprises enclosing the surfaces of the crystals of the thiosulfate in triethanolamine containing sulfur dioxide, whereby access of acid in the composition to the crystals is prevented.

4. The method of rendering immune to sulfurization the sodium thiosulfate crystals contained in a powdered composition adapted for making up a photographic fixing bath and comprising sodium thiosulfate, sodium sulfite, alum, and a solid organic acid, which comprises mixing crystallized sodium thiosulfate and crystallized sodium sulfite, heating the mixture to a temperature sufficient to cause the salts to melt in their water of crystallization, and continuing the heating until the water is driven off, whereby the thiosulfate crystals are enclosed in sodium sulfite in such manner as to prevent access of acid in the composition thereto.

5. The method of preparing a solid composition adapted for the preparation of an acid hardening fixing bath which comprises heating a mixture of crystallized sodium thiosulfate and crystallized sodium sulfite to a temperature sufficient to cause the salts to melt in their water of crystallization, continuing the heating until the water is driven off, whereby the thiosulfate crystals are enclosed in sodium sulfite in such manner as to prevent access of acid in the composition thereto, and mixing the resultant dehydrated mixture of crystals with alum and a solid organic acid.

6. A solid composition adapted for the preparation of a photographic acid hardening fixing bath comprising sodium thiosulfate, sodium sulfite, alum, and a solid organic acid in which the surfaces of the sodium thiosulfate crystals are enclosed in a normal sulfite, whereby access of acid in the composition to the crystals is prevented.

7. A solid composition adapted for the preparation of a photographic acid hardening fixing bath comprising sodium thiosulfate, sodium sulfite, alum, and a solid organic acid in which the surfaces of the sodium thiosulfate crystals are enclosed in a sulfite selected from the group consisting of sodium sulfite and triethanolamine sulfite, whereby access of acid in the composition to the crystals is prevented.

8. A solid composition adapted for the preparation of a photographic acid hardening fixing bath comprising sodium thiosulfate, sodium sulfite, alum and a solid organic acid in which the surfaces of the sodium thiosulfate crystals are enclosed in sodium sulfite, whereby access of acid in the composition to the crystals is prevented.

9. A solid composition adapted for the preparation of a photographic acid hardening fixing bath comprising sodium thiosulfate, sodium sulfite, alum, and a solid organic acid in which the surfaces of the sodium thiosulfate crystals are enclosed in triethanolamine sulfite, whereby access of acid in the composition to the crystals is prevented.

10. Powdered material capable, when dissolved, of constituting an acid hardening fixing bath comprising:

| | Grams |
|---|---|
| Anhydrous sodium thiosulfate | 160 |
| Sodium sulfite | 5 |
| Sodium bisulfite | 5 |
| Boric acid | 5 |
| Sodium acetate (anhydrous) | 22.5 |
| Potassium alum | 22.5 | and in which the surfaces of the sodium thiosulfate crystals are enclosed in the sodium sulfite, whereby access of acid in the composition to the crystals is prevented.

11. A powdered material capable, when dissolved, of constituting an acid hardening fixing bath comprising:

| | Grams |
|---|---|
| Anhydrous hypo | 160 |
| Triethanolamine | 1 |
| Sulfur dioxide | 1 |
| Sodium bisulfite | 7.5 |
| Alum | 22.5 |
| Sodium acetate (anhydrous) | 22.5 |
| Boric acid | 5.0 | and in which the surfaces of the sodium thiosulfate crystals are enclosed in triethanolamine containing sulphur dioxide, whereby access of acid in the composition to the crystals is prevented.

12. The method of rendering immune to sulfurization the sodium thiosulfate crystals contained in a powdered composition adapted for making up a photographic fixing bath and comprising sodium thiosulfate, sodium sulfite, alum, and a solid organic acid, which comprises heating a mixture of crystallized sodium thiosulfate in the presence of anhydrous sodium sulfite until water of crystallization is driven off, whereby in intimate mixture of the two last named compounds is produced in which access of acid in the composition to the sodium thiosulphate is prevented, and employing the mixture as an ingredient of said powdered composition.

JOHN I. CRABTREE.
HAROLD D. RUSSELL.